United States Patent [19]

Pigott

[11] Patent Number: 4,759,489

[45] Date of Patent: Jul. 26, 1988

[54] AUTOMOBILE BODY BUILDING METHODS AND APPARATUS

[75] Inventor: Norman B. Pigott, Bishop's Stortford, England

[73] Assignee: Litton U.K. Limited, Aylesbury, England

[21] Appl. No.: 48,673

[22] Filed: May 11, 1987

[30] Foreign Application Priority Data

Jun. 24, 1986 [GB] United Kingdom ............... 8615401

[51] Int. Cl.⁴ .............................................. B23K 37/00
[52] U.S. Cl. ...................................... 228/102; 228/103; 228/105; 228/136; 228/170; 228/182; 228/5.1; 228/7; 228/49.1; 29/430; 29/469; 219/121.63; 219/121.64; 219/121.82
[58] Field of Search ............... 228/102, 103, 105, 135, 228/136, 170, 182, 5.1, 6.1, 7, 13, 15.1, 49.1; 901/2, 50; 29/429, 430, 428, 465, 469; 219/121 LC, 121 LD, 121 LY

[56] References Cited

U.S. PATENT DOCUMENTS

| | | | |
|---|---|---|---|
| 2,779,092 | 1/1957 | Gordon | 29/794 |
| 4,204,310 | 5/1980 | Auracher et al. | 29/469 |
| 4,441,645 | 4/1984 | Takagishi et al. | 901/50 |
| 4,442,335 | 4/1984 | Rossi | 901/50 |
| 4,590,654 | 5/1986 | Kajiura | 29/469 |

Primary Examiner—Nicholas P. Godici
Assistant Examiner—Samuel M. Heinrich
Attorney, Agent, or Firm—Lee & Smith

[57] ABSTRACT

In a method of building an automobile body separate upper and lower body modules (50, 78) are formed, incorporating the roof area and the floor area of the automobile respectively, precision mating locations (62) on the body modules are used first as reference for fitting interior parts and equipment to the respective modules and then for fitting the modules together. An assembly line for carrying out the method has respective sets of stations for forming operations on upper and lower body modules, a mating station (30) at which the two modules are brought together and a joining station (32) where they are, for example, welded. The leading station (20, 22) in each set determines a master body point (64, 82) on a module presented to it, and forms the mating locations (62) on the module with reference to the master body point.

11 Claims, 15 Drawing Sheets

AUTOMOBILE BODY BUILDING METHODS AND APPARATUS

FIELD OF THE INVENTION

This invention relates generally to method and apparatus for building and assembly of automobile bodies.

BACKGROUND TO THE INVENTION

It has been and remains conventional practice in the automobile industry for car bodies to be built as an open box structure into which are fitted and fixed all the body space parts and equipment such as the dashboard, instrument panel, wiring loom, roof lining, sound deadeners, carpets, front and rear seats, etc.

It is a general aim of this invention to provide an improved method and apparatus for automobile body building which has substantial advantages over the conventional practice, as will be made clear hereinafter.

THE INVENTION

According to one aspect of the present invention, a method of automobile body building comprises the steps of:

forming an upper body module incorporating the roof area;

forming a lower body module incorporating the floor;

precision forming mating locations on the upper and lower body modules;

utilising the locations on the upper module as references for the fitting of interior parts and equipment into the upper module;

utilising the locations on the lower module as references for the fitting of interior parts and equipment into the lower module;

fitting the upper and lower modules together by use of the mating locations after the interior parts and equipment have been fitted into both modules.

In a preferred method, a master body point is selected and location masters cooperate with the upper and lower body modules at the master point, whilst the mating locations are provided on each module in precise positional relationship to the location master cooperating with the module.

The method is preferably carried out on an assembly line which includes a series of stations, one set for the upper module and one set for the lower module. A leading station in each set enables the locations to be provided on the respective module, in each case with reference to the master body point, and successive subsequent stations in each set utilise the locations to define reference axes in the respective module enabling the precision mounting of sub-assemblies which constitute the required interior parts and equipment. The two modules are then brought together at a mating station, from which the two mated parts pass to a joining station such as a laser welding station.

According to another aspect of the invention, therefore, apparatus for automobile body building comprises two sets of work stations, the first set comprising a leading station at which an upper body module incorporating the roof area is formed with a set of locations with reference to a master body point and one or more subsequent stations at which sub-assemblies are fitted to the upper module utilising the locations on said module to define reference axes which enable precision mounting of said sub-assemblies, the second set of work stations comprising similar leading and subsequent stations for the lower module, a mating station at which the upper and lower modules each with fitted sub-assemblies are mated together by use of the respective locations on the two modules, and a joining station at which the mated upper and lower modules are permanently fixed together.

An important aspect of the invention concerns a preferred structure of the mating locations formed on the upper and lower modules. In this preferred arrangement, one module is provided with precision drilled holes and the other module is provided with precision turned pins for precisely mating with the holes. When the two modules have been accurately located in mating engagement, as by means of a vision unit, locking in the mated condition prior to permanent joining may be achieved by forming the pins as hollow cylinders, enabling passage of a bolt carrying a threaded tapered plug, whereby rotation of the bolt, as by means of a nut runner, draws the plug into the hollow pin to expand it into tight engagement in the hole in which it is located. The positions of the car body at which joints between the modules are located are desirably such that they can be covered, as by plastics panels in the case of a space frame body construction or by finishing covers in the case of a monocoupe body construction. A monocoupe body construction will include a roof formed as an integral part of the upper module.

Advantages obtainable from the invention are that the same lower module can be employed to mate with sedan, coupe or other module types, that greater flexibility in body style is enabled, that model changes are rendered easier and at less cost in making the change, that upper and lower module construction and module mating and joining can respectively be carried out at different sites, and that overall plant area for production is reduced. The invention is applicable to both space frame and monocoupe body types, and painting of both upper and lower modules is preferably completed prior to carrying out the invention, so that a finish paint operation may sometimes be avoidable. In any event, the invention also simplifies application of exterior body trims, fender mouldings and the like.

DESCRIPTION OF DRAWINGS

The invention will now be exemplified with reference to the accompanying drawings, in which.

DESCRIPTION OF EMBODIMENT

Figure 1:
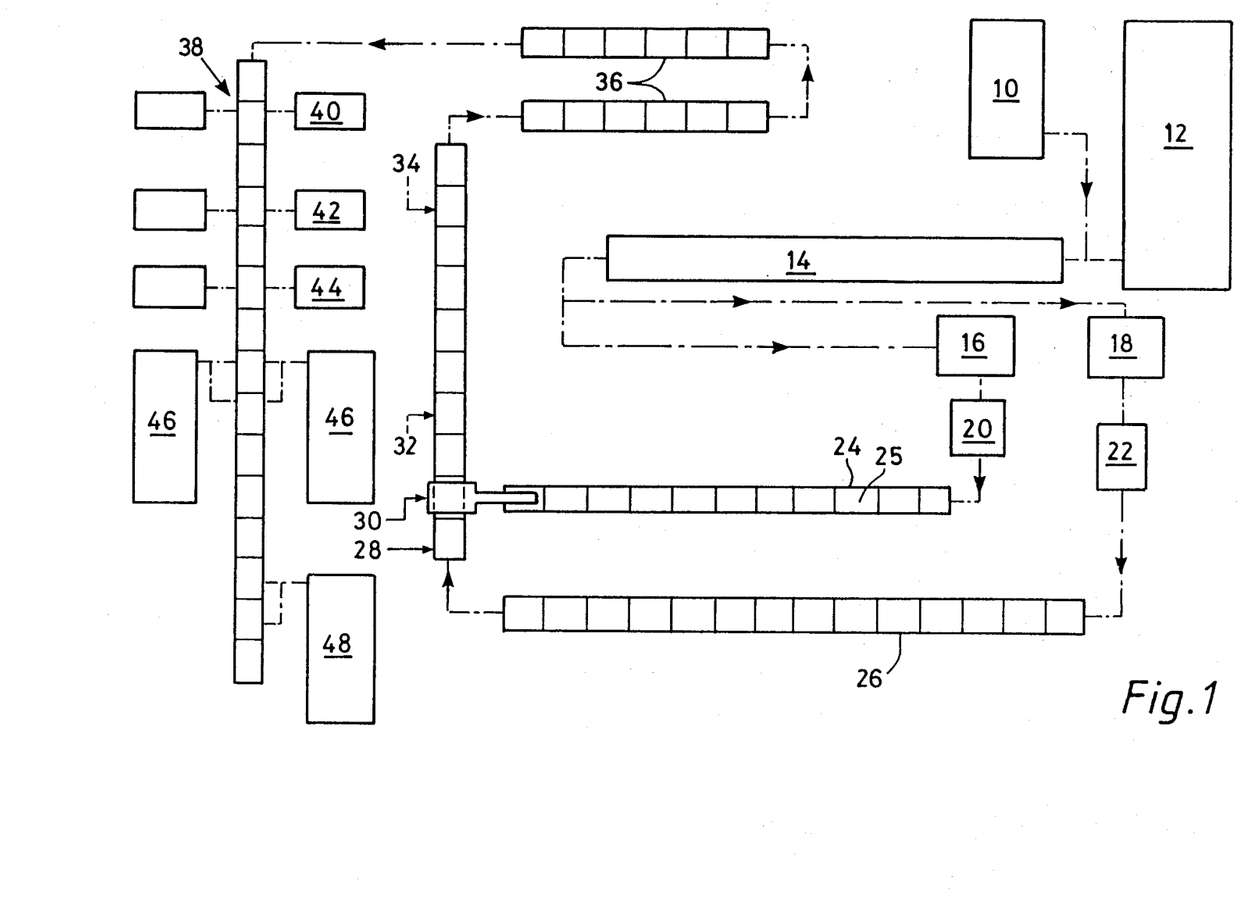
FIG. 1 shows a process lay-out in a production plant.

Referring to FIG. 1, a typical layout in a processing plant is illustrated, for building an automobile body in accordance with the invention.

A paint process line 14 receives upper and lower body modules from respective upper and lower module construction sites 10 and 12. The upper and lower modules emergent from paint processing take separate paths through two sets of work stations, each set commencing with a vertical buffer station, designated 16 for the upper module and 18 for the lower module. The vertical buffer stations 16 and 18 are followed by respective machining stations 20 and 22 for the upper and lower modules. The modules, each with machined mating locations thereon, then pass to a succession of trim application stations, designated 24 and 26 for the upper and lower modules, respectively, at which the various interior parts and equipment are precision fitted to the modules, making use of references defined by the machined locations. The completed lower modules then pass through a sealer and/or adhesive station 28 to a mating station 30 to which the completed upper modules are also fed. At the mating station 30, upper and lower modules are mated together in pairs, before passing to a joining station 32 at which they are permanently joined, as by laser welding. Subsequent stations are for assembly steps effected after the basic automobile body has been assembled in accordance with the invention, and include injection moulding stations 34, a chassis line 36, and a line 38 for application of side mouldings at 40, rear quarter mouldings at 42, fenders at 44 and doors at 46, and possibly application of a hood and deck at 48.

It wil be noted that the trim application line 24 for the upper modules includes an inverting station 25.

Figure 2:
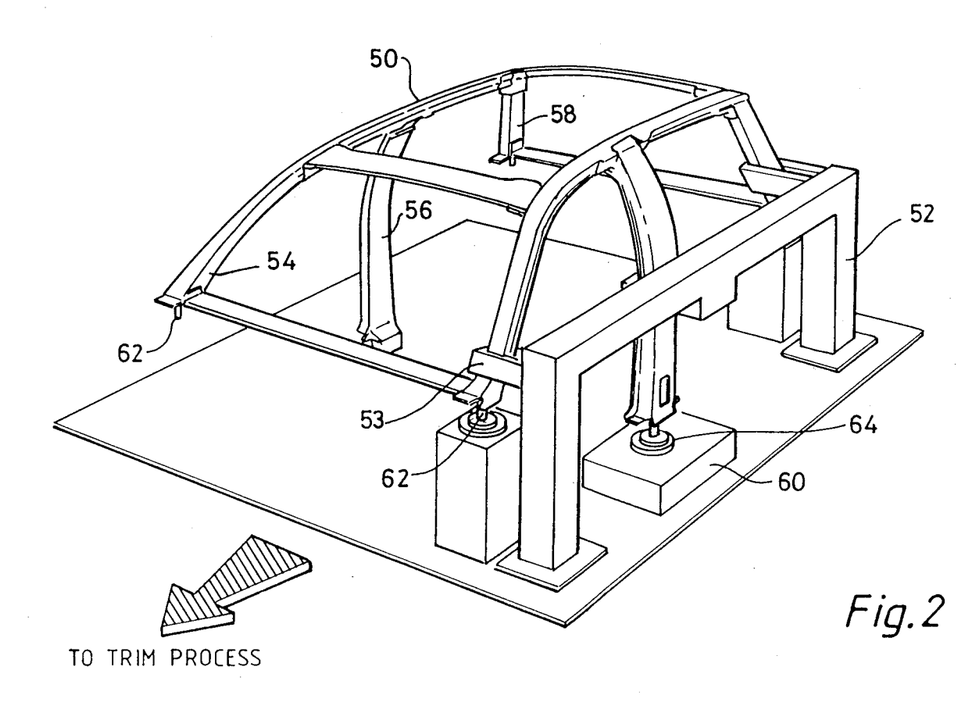
FIG. 2 shows an upper body module in a machining station.

Referring now to FIG. 2, reference 50 denotes an upper body module as received in the machining station 20 from the paint process line. The module 50 is held in clamps 53 on a clamping buck 52. At the bottom of each of the six posts of this module, which may be called the pair of front posts 54, the pair of centre posts 56 and the pair of rear posts 58, a turning tool 60 giving a precision outside diameter acts on the module to form a hollow locating pin 62. The action of these tools is computer controlled, and precisely fixes the position of the locating pins relative to a location master 64 at the bottom of one of the centre posts. This location master 64 corresponds to a master body point which constitutes a basic datum for relative positioning of parts throughout the process. Relative to the location master 64, the other locations 62 define reference axes which enable parts to be fitted with precision, and subsequently enable the upper and lower modules to be precisely mated together over their entire extent.

Figure 3:
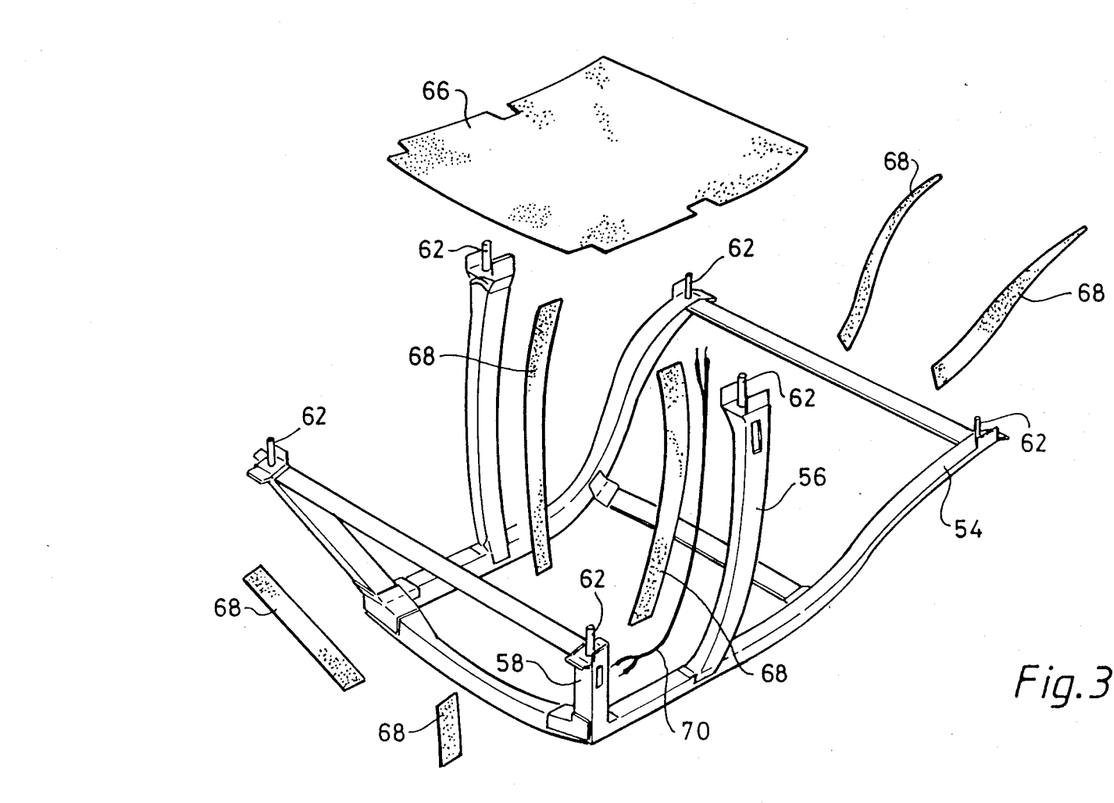
FIGS. 3 to 5 respectively show an upper body module in successive trim application stations.

FIG. 3 shows a trim application station at which an inside roof headlining 66, post trims 68 and an electrical wiring loom 70 are precision fitted to the upper module after inversion of the latter. Although not shown, the upper module may include a steel roof. The module could be a finish painted unit.

Figure 4:
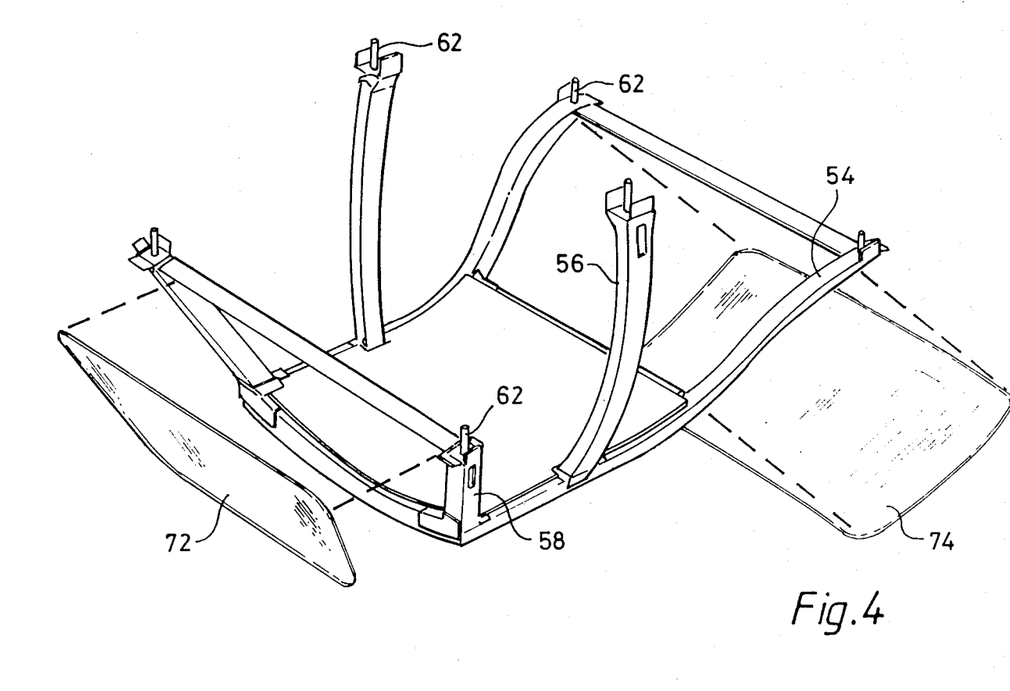
Figure 5:
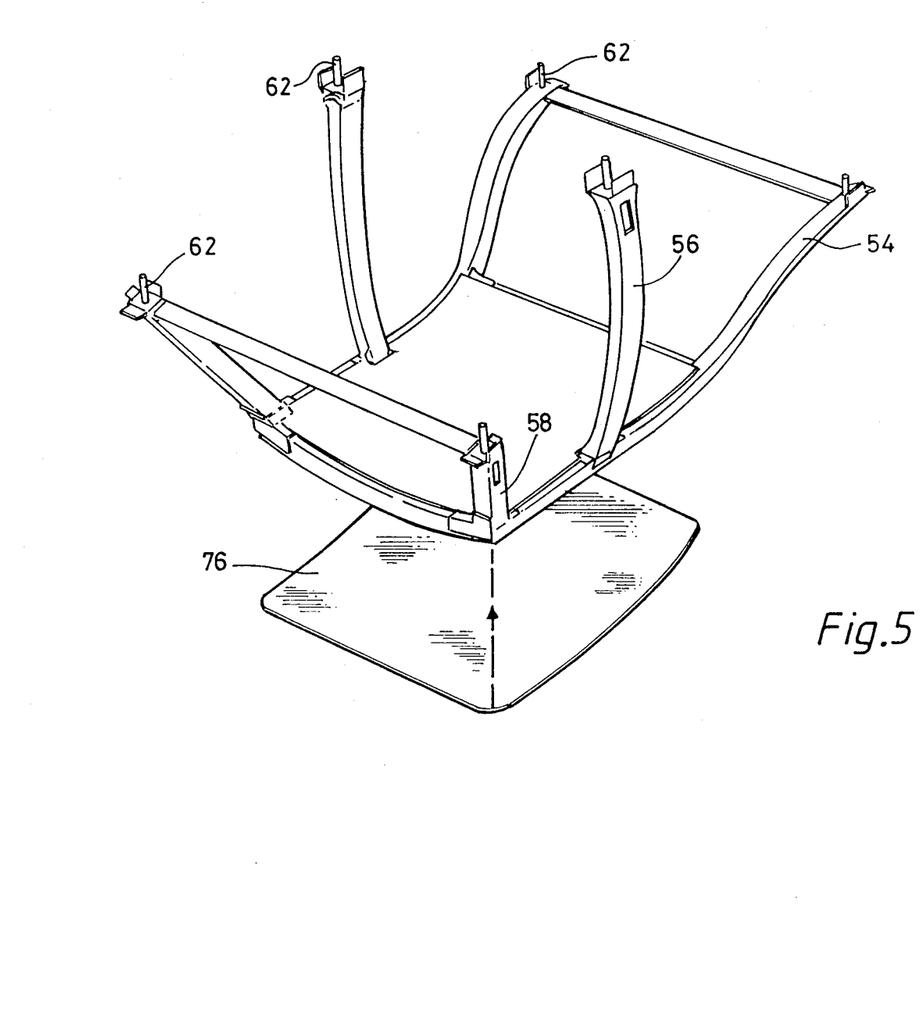

FIG. 4 shows the precision fitting of backlight 72 and windshield 74 in the inverted upper module, the glass being bonded in position at this station, while FIG. 5 illustrates the application of a plastics roof 76, which step could be transferred to the final line 38.

It is to be noted that the locating pins 62 serve in all these trim application stages in effect to define reference axes through the module which enable the accurate and precise positioning of the parts to be fitted by robotic positioning and fitting equipment.

Figure 6:
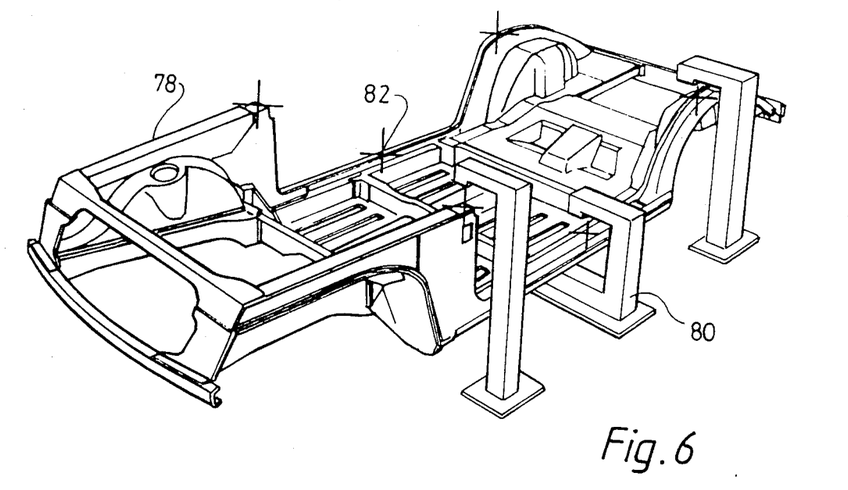
FIG. 6 shows a lower body module in a machining station.

FIG. 6 shows a lower body module 78 as received in the machining station 22 from the paint process line. This module 78 is likewise clamped in position, and is drilled with holes by precision drill units 80, computer controlled with reference to a location master 82 so that the holes constitute locations precisely matching the locating pins 62 precision formed on the upper module subsequently to enable mating therewith.

Figure 7:
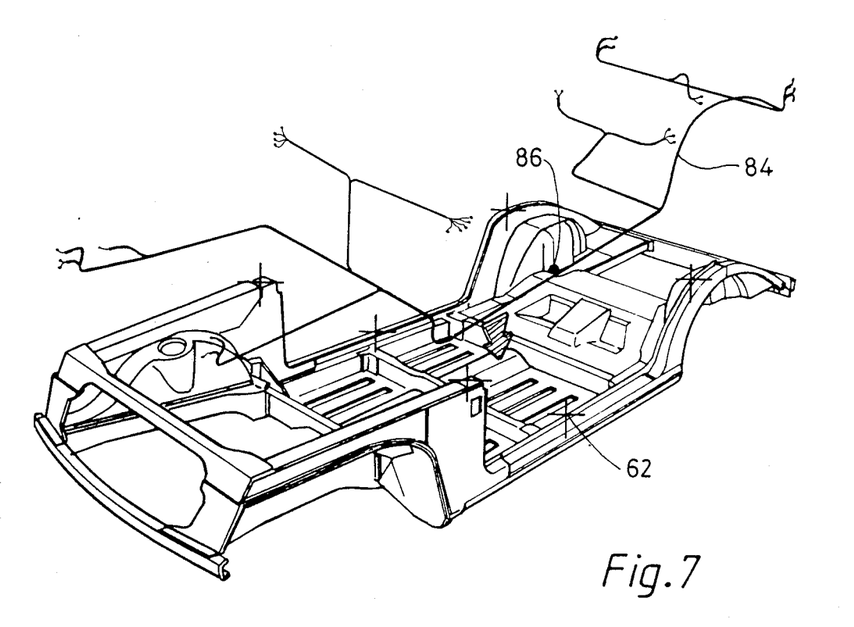
FIGS. 7 to 12 respectively show a lower body module in successive trim application stations.
Figure 8:
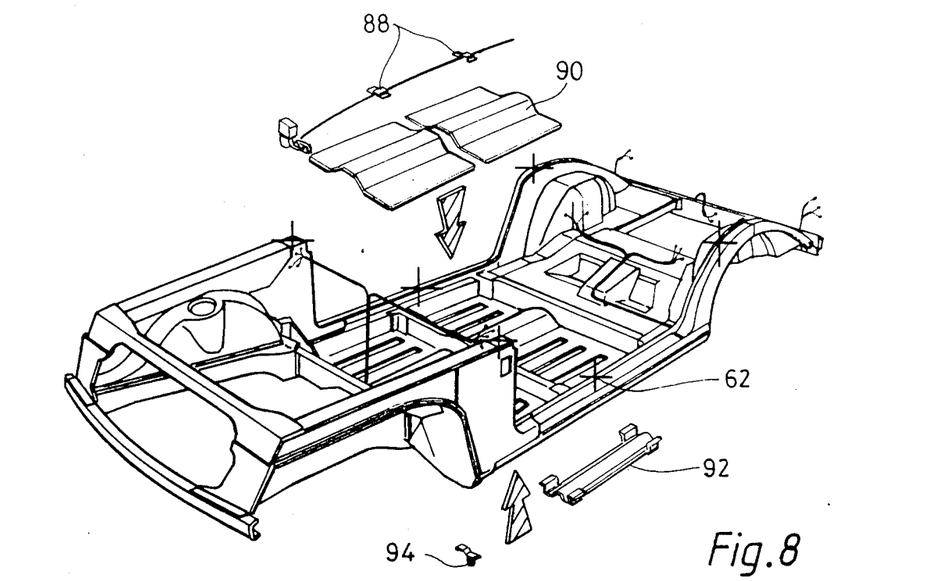
Figure 9:
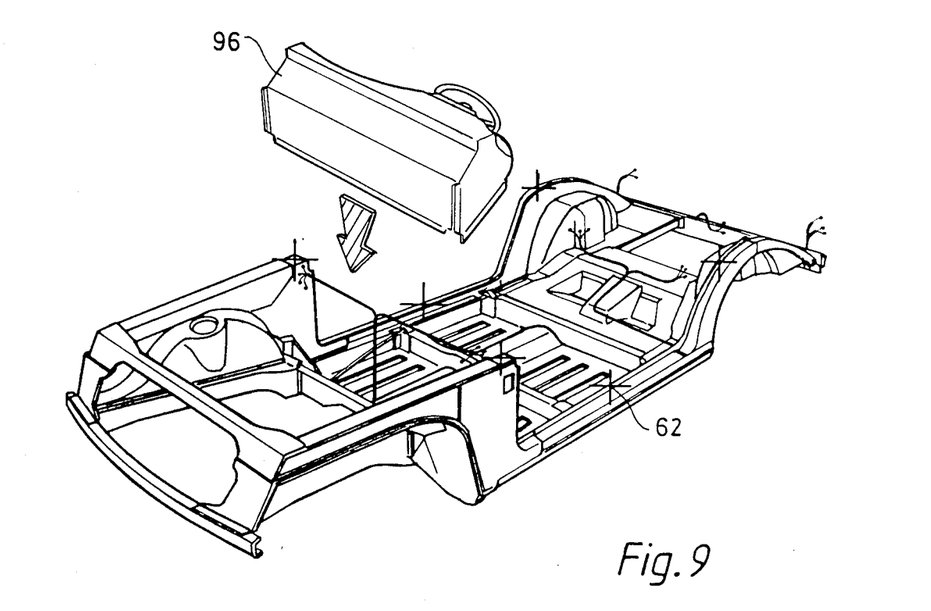
Figure 10:
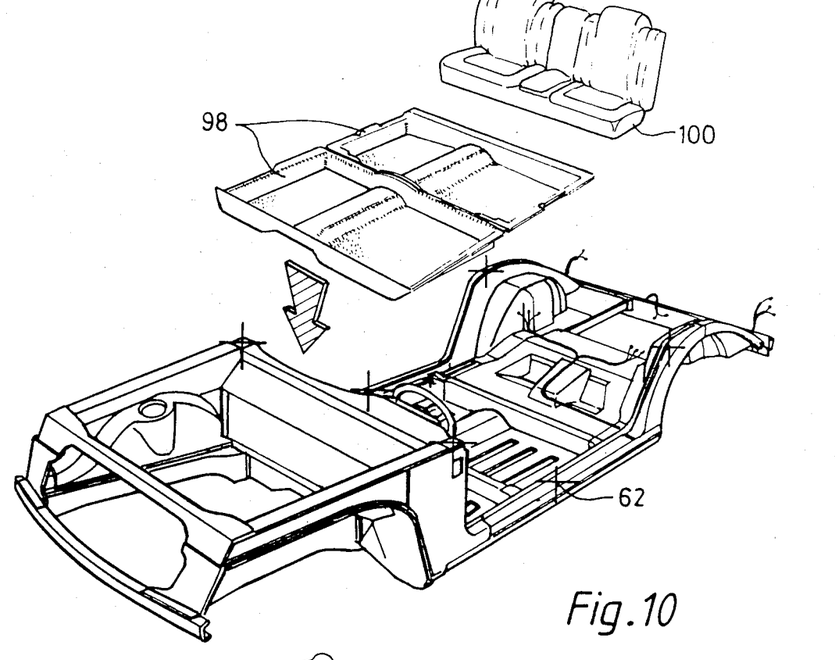
Figure 11:
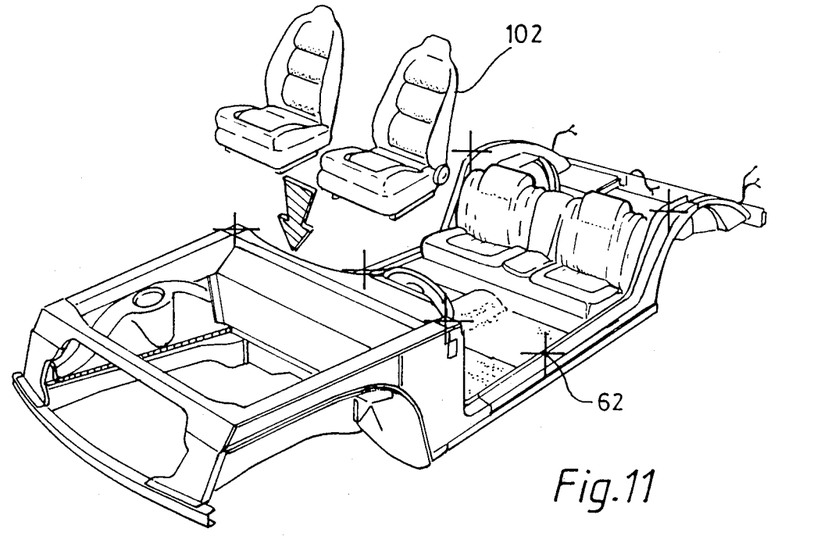
Figure 12:
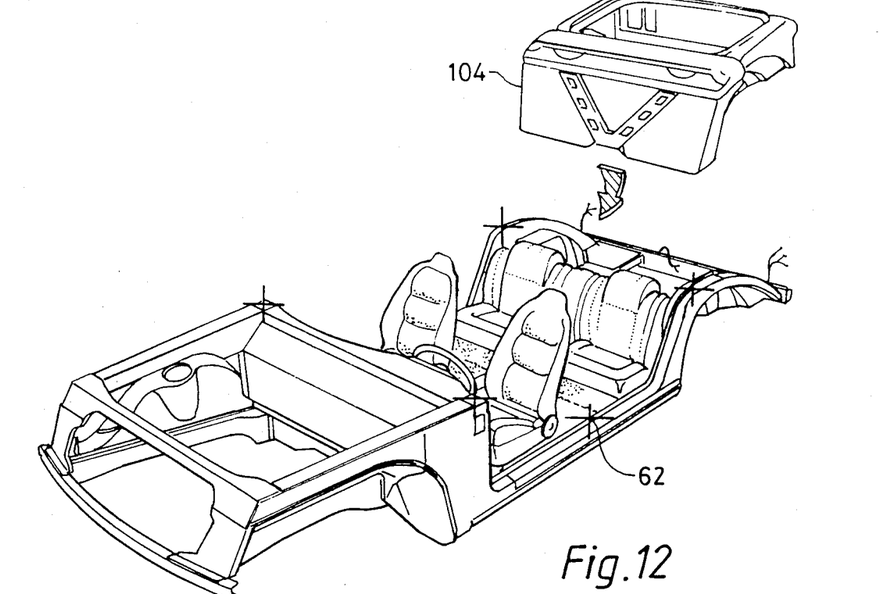

FIGS. 7 to 12 show successive trim application stations at which the following sub-assemblies or trims are fitted to the lower body module, again making use of the machined locations to define references enabling the precision fitting of parts by robotic equipment. In FIG. 7, reference 84 denotes the main wiring loom with connection structure 86. In FIG. 8, reference 88 denotes the console brackets, 90 the acoustic deadeners, 92 the heat shield, 94 the exhaust hanger. In FIG. 9, reference 96 denotes the instrument and dashboard sub-assembly. In FIG. 10, reference 98 denotes the carpets and reference 100 the rear seats. In FIG. 11, reference 102 denotes the front seats, while in FIG. 12 reference 104 denotes the rear trunk or boot sub-assembly.

Figure 13:
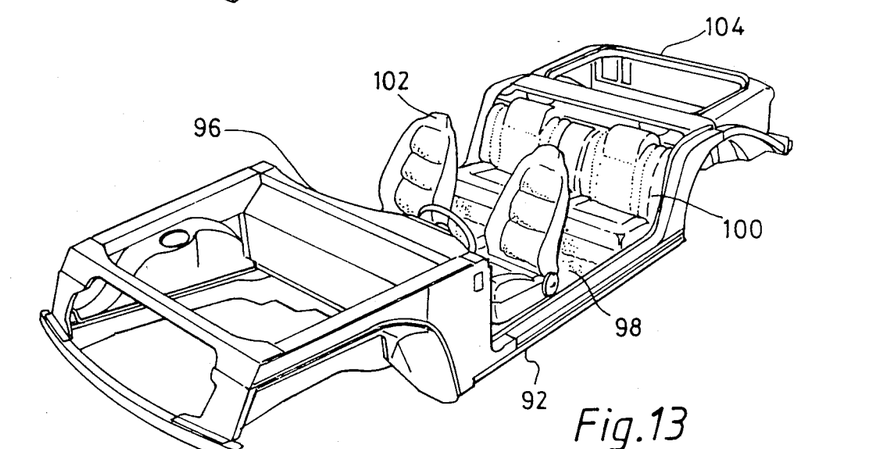
FIG. 13 shows a finished lower body module.

FIG. 13 shows a completed lower body module.

Figure 14:
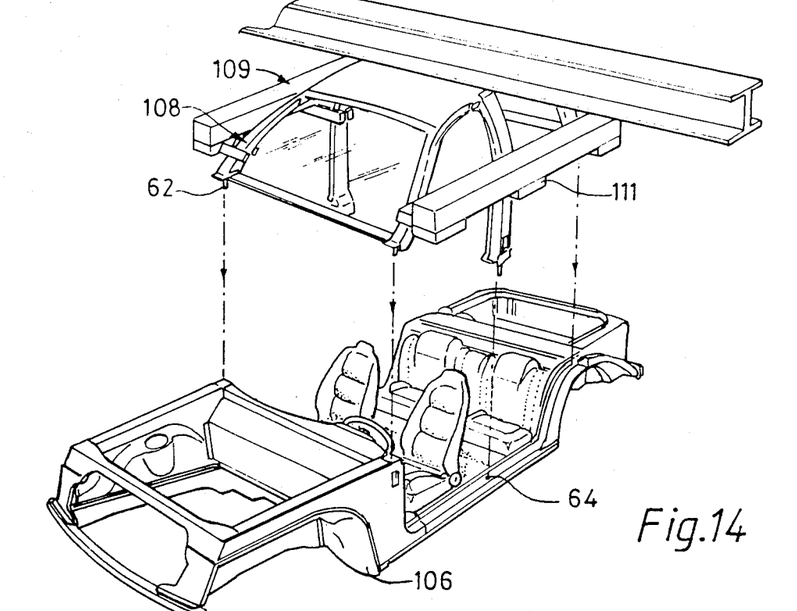
FIG. 14 shows a mating station at which upper and lower body modules are mated together.

Following the completion of the upper and lower modules, they pass in pairs to a mating station shown in FIG. 14. The completed lower module 106 is precisely located, and the completed upper module 108 carried by clamp 109 is located into engagement therewith at the mating locating pins and holes. Precise location is by vision units and preferably vision set servo-mechanisms 111. As will be clear from a subsequent description of FIG. 16, automatic nut runners are applied to the structure locating points to expand locating plugs to correct torque settings, and thus fix the upper and lower body modules together. Registration of the location masters 64 ensures that the locating pins and holes mate together substantially without any requirement for bending or flexing equipment to distort any part of either module, which retain their original production shapes during trim application due to use of the location masters as a basic datum throughout the process.

Figure 15:
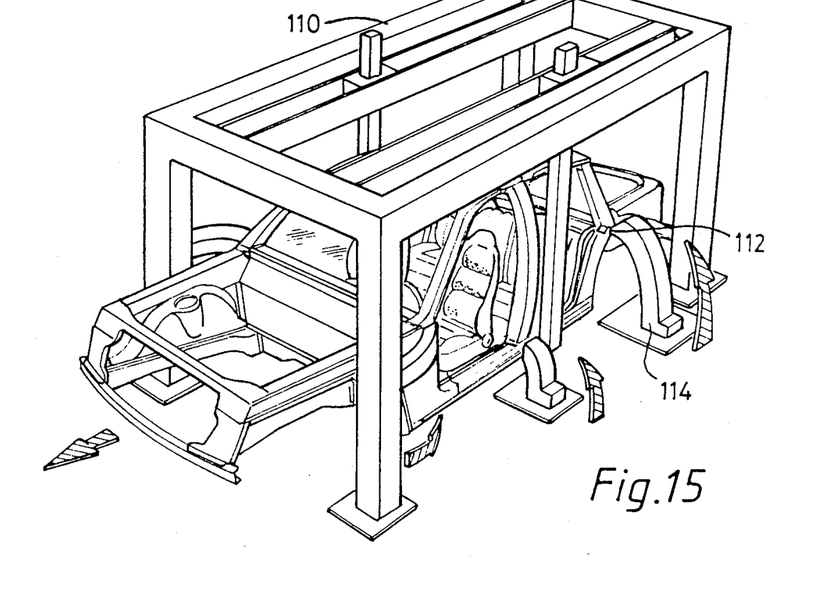
FIG. 15 shows a joining station.

From the mating station, the locked together upper and lower modules forming automobile body 109 pass to the joining station shown in FIG. 15, wherein the reference 110 denotes a gantry or floor mounted robotic laser welding unit. Reference 112 denotes the site of a possible mechanical lock effected between the modules, whilst reference 114 denotes pusher units which may be employed to assist panel fitting.

Figure 16:
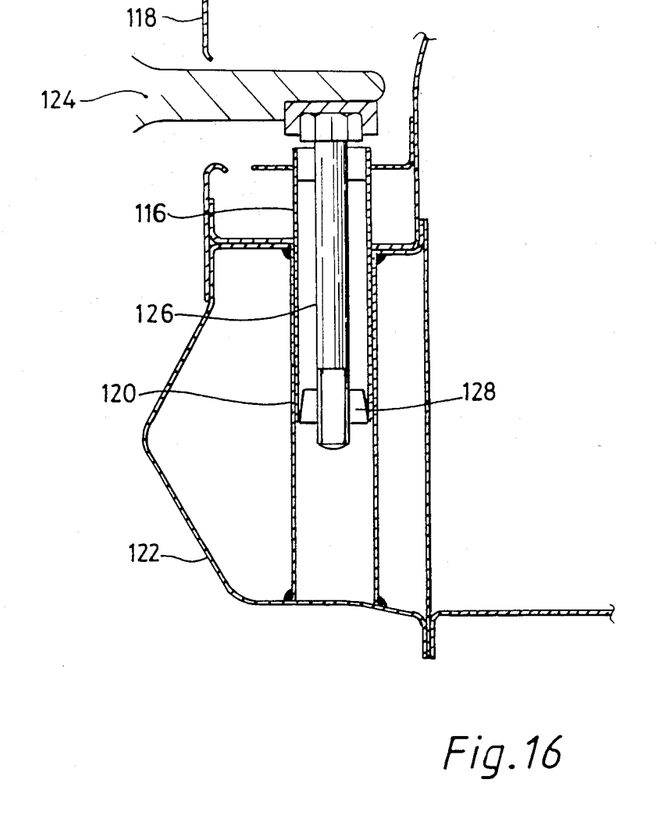
FIG. 16 shows the general principle utilised in a preferred structure of mating locations.

FIG. 16 shows the principle of the structure which is employed at the mating locations. In this figure, the precision turned locating pin on the upper module 118 is referenced 116 and the precision drilled locating hole in the lower module 122 is referenced 120. A nut runner 124 is employed to tighten bolt 126, drawing up the conical plug 128 in order to expand the locating pin 116 into tight engagement in the locating hole 120. As previously mentioned, relative positioning of the modules is assisted by use of a vision unit. A sealing and/or structural adhesive compound may also be employed at the joint.

Figure 17:
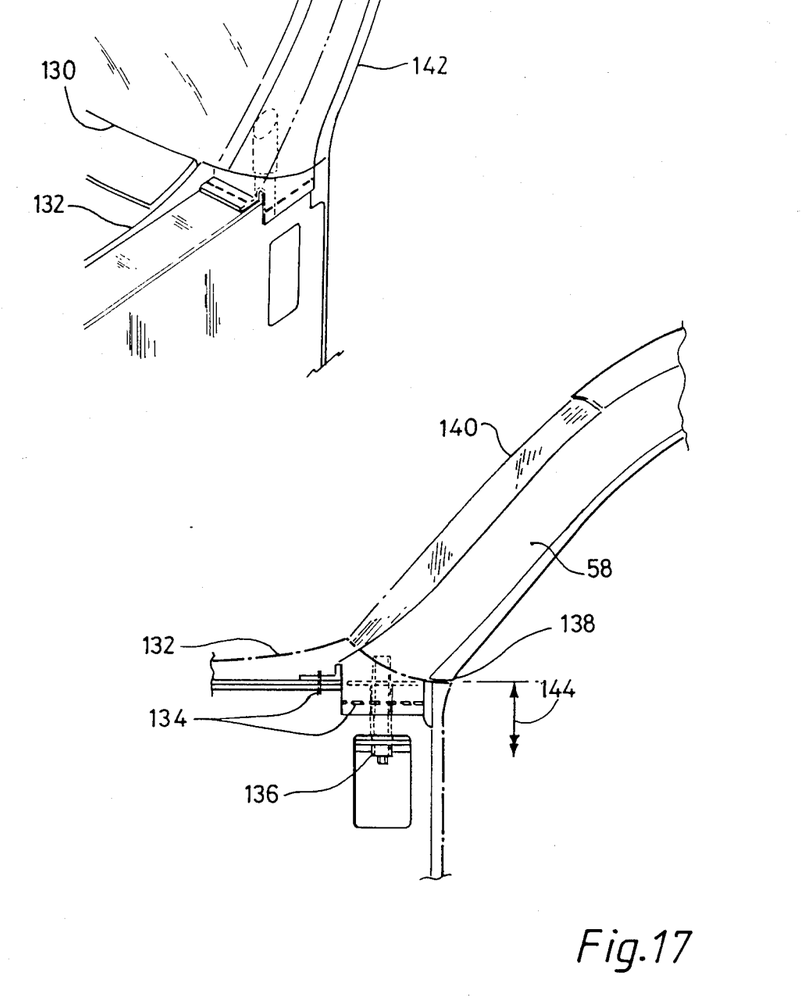
FIGS. 17 to 19 respectively show the form of joining preferred at the respective individual mating locations.
Figure 18:
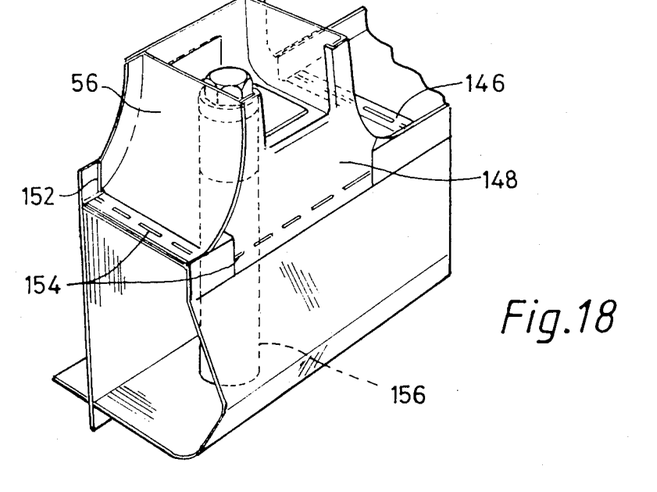
Figure 19:
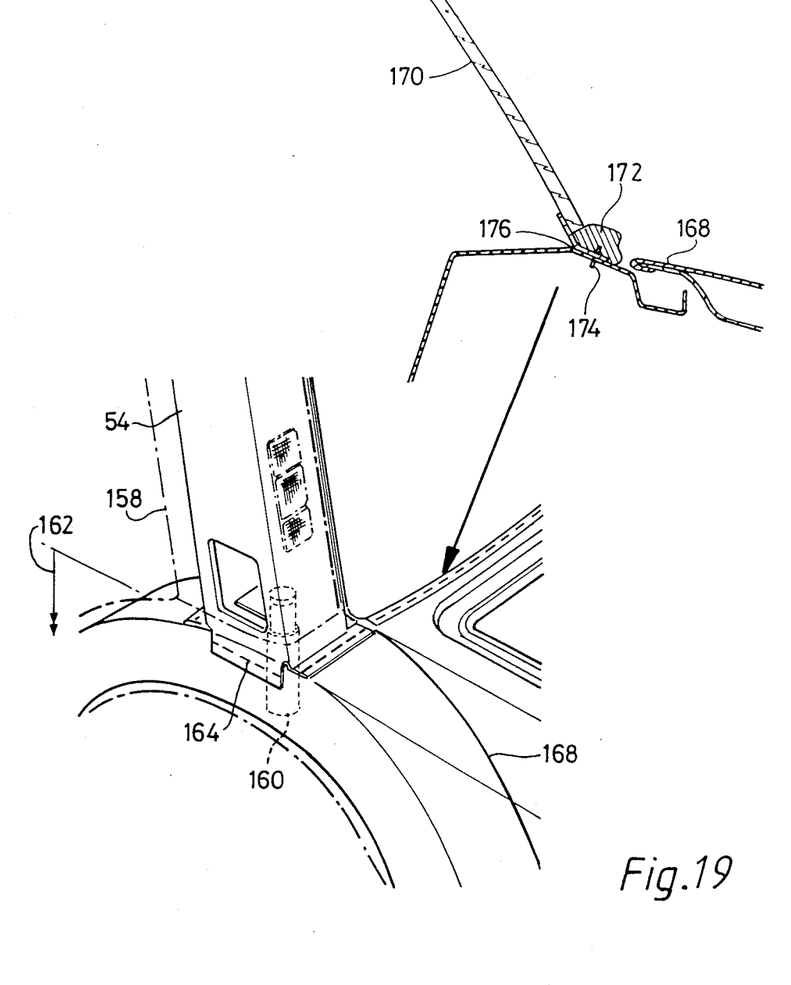

FIGS. 17 to 19 show the individual joints in more detail, respectively at the bottom of the front, center and rear posts of the upper module at which said module is joined with the lower module.

FIG. 17 refers to the bottom of the front post 58, and the following references are employed to denote the various parts and components:
130—hood or plastics cowl top
132—front fender of plastics or steel
134—mechanical or laser joint
136—mating locations
138—structural adhesive or sealer
140—glass bonded to upper module
142—door Reference 144 indicates a height datum defined by the mating locations.

In FIG. 18, which refers to the centre post 56, the following references are used:
146—flanges
148—snap-in plastics finisher
152—mechanical or laser joint
154—laser welds
156—mating locations. The location master at this point defines centre line (C.L.) and longitudinal (Fwd) axes, as indicated.

Figure 20:
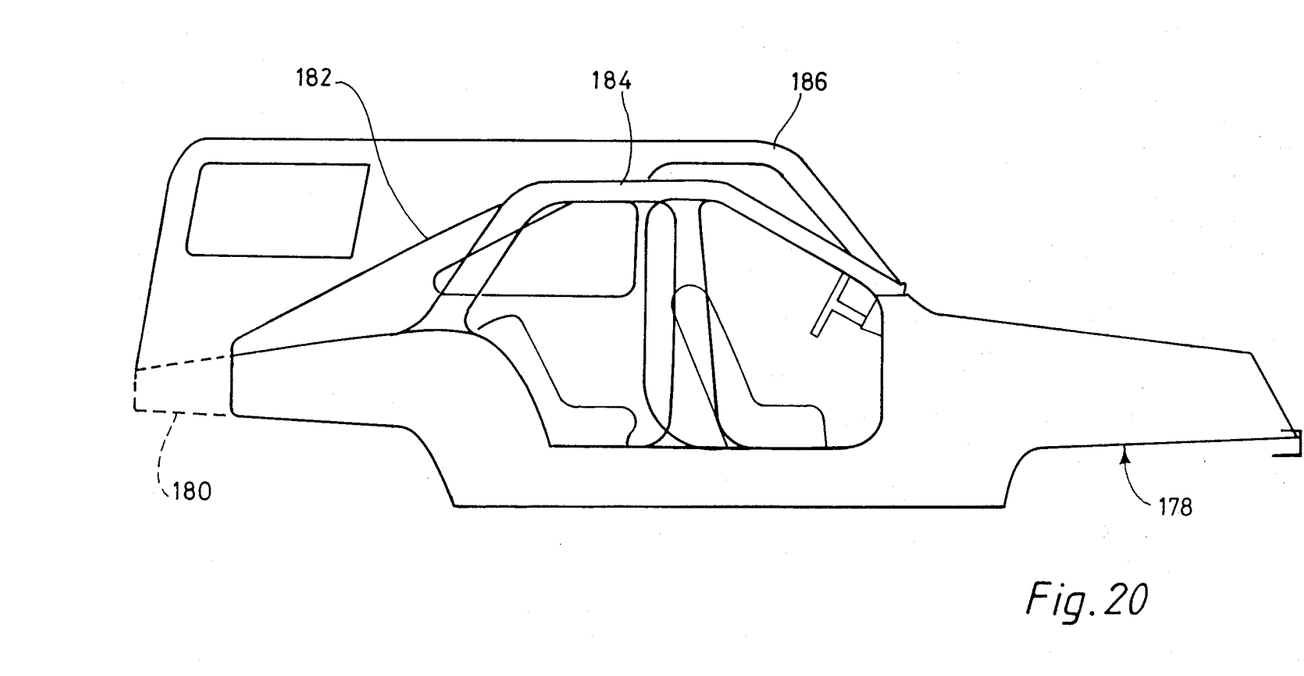
FIG. 20 illustrates the adaptability of the process to differing model types.

FIG. 19 shows the joint at the rear post 54, in the case of a monocoupe body. In this figure the following references are used:
158—rear post plastics moulding
160—mating locations
162—height datum defined by mating locations
164—laser weld
168—lower module
170—glass bonded to upper module
172—plastics moulding
174—laser or mechanical joint
176—structural adhesive or sealer Finally, FIG. 20 shows the versatility of construction afforded by the invention. A common lower module 178, having an optional extension 180, may be mated with a coupe upper module 182, a sedan upper module 184 or a wagon or van upper module 186. In a space frame construction, bonded exterior plastics may provide an outer skin, whilst in a monocoupe or sedan, suitable cover mouldings may cover the module joints.

The method and apparatus as exemplified with reference to the drawings may be modified in various ways within the scope of the invention hereinbefore defined.

I claim:

1. A method of automobile body building which comprises the steps of:
   forming an upper body module incorporating the roof area;
   forming a lower body module incorporating the floor area;
   precision forming mating locations on the upper and lower body modules;
   utilising the locations on the upper module as references for the fitting of interior parts and equipment into said upper module; and
   fitting the upper and lower modules together by use of said mating locations after said interior parts and equipment have been fitted into both modules.

2. A method according to claim 1, comprising the steps of selecting a master body point and providing location masters which cooperate with the upper and lower body modules at said master point, while the mating locations are provided on each module in precise positional relationship to the respective location masters.

3. A method according to claim 2, carried out on an assembly line which includes a series of stations, comprising one set of stations for the upper module and one set of stations for the lower module.

4. A method according to claim 3, wherein at a leading station in each set of stations the locations are provided on the respective module, in each case with reference to the master body point, and at successive subsequent stations in each set the locations are utilised to define reference axes in the respective module enabling the precision mounting of sub-assemblies which constitute interior parts and equipment.

5. A method according to claim 4, wherein the two modules are brought together at a mating station, from which the two mated parts pass to a joining station at which the mated parts are laser welded together.

6. A method according to claim 1, wherein one module is provided with precision drilled holes at said locations and the other module is provided with precision turned pins at said locations for precisely mating with the holes.

7. A method according to claim 6, wherein when the modules have been accurately located in mating engagement, by means of a vision unit, locking in the mated condition prior to permanent joining is achieved by forming the pins as hollow cylinders each having a locating hole, and passing a bolt carrying a threaded tapered plug into the cylinder whereby on rotation of the bolt by means of a nut runner the plug is drawn into the hollow cylinder to expand it into engagement with said locating hole.

8. A method according to claim 1, wherein the positions on the car body at which joints between the modules are located are selected such that in the completed body said positions are covered, by plastics panels and by finishing covers.

9. Apparatus for automobile body building, comprising two sets of work stations, the first set comprising an upstream station at which an upper body module incorporating a body roof area is formed with a set of locations with reference to a master body point and at least one subsequent station at which sub-assemblies are fitted to the upper module utilising the locations on said module to define reference axes which enable precision mounting of said sub-assemblies, the second set of work stations comprising a similar upstream station for a lower module incorporating a body floor area, a mating station at which the upper and lower modules each with fitted sub-assemblies are mated together by use of the respective locations on the two modules, and a joining station at which the mated upper and lower modules are permanently fixed together.

10. Apparatus according to claim 9, wherein the upper body module is formed with front, center and rear posts, and each upstream station includes a computer controlled machining tool for respectively forming cooperating locating pins at the bottom ends of the upper module posts and corresponding locating holes in the lower body module adjacent the edge of the floor, respectively with spatial reference to the location masters respectively cooperating with the upper module at the bottom of one of the center posts and at the corresponding center post matching point on the lower module.

11. Apparatus for automobile body building comprising:
   (a) a first work station for forming an upper body roof module incorporating locations with reference to a master body point;

(b) a sub-assembly station for fitting sub-assemblies to said upper module using said locations for precision fitting thereof;

(c) a second work station for forming a lower body floor module incorporating corresponding mating locations;

(d) a mating station for mating together said upper and lower modules and associated fitted sub-assemblies by use of respective said locations on said modules; and (e) a joining station for permanently fixing together said mated upper and lower modules.

* * * * *